United States Patent
Aozasa et al.

(10) Patent No.: US 7,361,322 B2
(45) Date of Patent: Apr. 22, 2008

(54) CERIC OXIDE AND METHOD FOR PRODUCTION THEREOF, AND CATALYST FOR EXHAUST GAS CLARIFICATION

(75) Inventors: Shigeru Aozasa, Anan (JP); Emmanuel Rohart, Sainte Soulle (FR); Lianxin Dai, Osaka (JP); Bernard Pacaud, Nishinomiya (JP)

(73) Assignee: Anan Kasei Co., Ltd., Hyogo (JP)

( * ) Notice: Subject to any disclaimer, the term of this patent is extended or adjusted under 35 U.S.C. 154(b) by 0 days.

(21) Appl. No.: 11/673,352

(22) Filed: Feb. 9, 2007

(65) Prior Publication Data

US 2007/0128097 A1  Jun. 7, 2007

Related U.S. Application Data

(63) Continuation of application No. 10/488,826, filed as application No. PCT/JP2002/09025 on Sep. 5, 2002, now abandoned.

(30) Foreign Application Priority Data

Sep. 7, 2001  (JP) ............... 2001-272054

(51) Int. Cl.
  *B01J 23/00* (2006.01)
  *C01F 17/00* (2006.01)
(52) U.S. Cl. ............ 423/263; 423/21.1; 502/304
(58) Field of Classification Search ......... 423/21.1, 423/263; 502/304
  See application file for complete search history.

(56) References Cited

U.S. PATENT DOCUMENTS

| | | | |
|---|---|---|---|
| 4,661,330 A * | 4/1987 | Chane-Ching et al. | 423/263 |
| 4,663,137 A * | 5/1987 | Chane-Ching et al. | 423/263 |
| 4,965,057 A * | 10/1990 | David et al. | 423/263 |
| 5,002,747 A * | 3/1991 | Le Loarer | 423/263 |
| 5,011,671 A * | 4/1991 | Le Loarer | 423/263 |
| 5,017,352 A * | 5/1991 | Chane-Ching et al. | 423/263 |
| 5,023,070 A * | 6/1991 | Le Loarer | 423/263 |
| 5,080,877 A * | 1/1992 | Chane-Ching et al. | 423/263 |
| 5,174,984 A * | 12/1992 | Le Loarer | 423/263 |
| 5,279,789 A * | 1/1994 | Le Loarer et al. | 423/21.1 |
| 5,466,428 A * | 11/1995 | David et al. | 423/263 |
| 5,891,412 A * | 4/1999 | Le Loarer et al. | 423/263 |
| 2002/0016060 A1* | 2/2002 | Matsuzawa et al. | 438/633 |
| 2003/0215378 A1* | 11/2003 | Zhou et al. | 423/263 |
| 2005/0031517 A1* | 2/2005 | Chan | 423/263 |
| 2005/0113249 A1* | 5/2005 | Ziebarth et al. | 502/304 |
| 2006/0039846 A1* | 2/2006 | Hung et al. | 423/263 |

FOREIGN PATENT DOCUMENTS

| | | |
|---|---|---|
| EP | 0 870 543 A2 * | 10/1998 |
| EP | 0 955 267 A1 * | 11/1999 |
| JP | 02-221118 A1 * | 9/1990 |
| JP | 04-055315 A1 * | 2/1992 |
| JP | 05-105428 A1 * | 4/1993 |

OTHER PUBLICATIONS

Supplementary European Search Report for EP 02 76 7896 mailed Dec. 14, 2005.*
International Search report for International Application No. PCT/JP02/09025, filed Sep. 5, 2002.*

* cited by examiner

*Primary Examiner*—Timothy C. Vanoy
(74) *Attorney, Agent, or Firm*—Darby & Darby P.C.

(57) ABSTRACT

The present invention relates to ceric oxide that has excellent heat resistance and oxygen absorbing and desorbing capability useful as a co-catalyst material suitable for a catalyst for purifying exhaust gas, that is capable of maintaining a large specific surface area even in use in a high temperature environment, and that is suitable for use in a high temperature environment, yet capable of exhibiting high oxygen absorbing and desorbing capability also in a lower temperature range, a method for preparing such ceric oxide, and a catalyst for purifying exhaust gas utilizing such ceric oxide. The ceric oxide is an oxide composed essentially of ceric oxide, and has a specific surface area of not smaller than 30.0 m$^2$/g after calcination at 900° C. for 5 hours.

9 Claims, 1 Drawing Sheet

CERIC OXIDE AND METHOD FOR PRODUCTION THEREOF, AND CATALYST FOR EXHAUST GAS CLARIFICATION

This application is a continuation of U.S. Ser. No. 10/488,826, filed May 4, 2004, which is a national phase application of International Application No. PCT/JP2002/09025, filed Sep. 5, 2002, which was published in English as International Publication No. WO 2003/02274 and claims the benefit of Japanese Patent Application No. 2001-272054, filed Sep. 7, 2001, the entire disclosures of which are incorporated by reference herein.

FIELD OF ART

The present invention relates to ceric oxide that has excellent heat resistance useful for catalysts, functional ceramics, solid electrolyte for fuel cells, and the like, and particularly suitable for use as a co-catalyst material in catalysts for purifying vehicle exhaust gas. The present invention also relates to a method for preparing such ceric oxide, and a catalyst for purifying exhaust gas utilizing such ceric oxide.

BACKGROUND ART

Catalysts for purifying vehicle exhaust gas are composed of a catalytic metal such as platinum, palladium, or rhodium, and a co-catalyst for enhancing the catalytic action of such metal, both supported on a catalyst support made of, for example, alumina or cordierite. As such a co-catalyst material are used cerium oxide-containing materials, which have the properties of absorbing oxygen under the oxidizing atmosphere and desorbing oxygen under the reducing atmosphere, originated in ceric oxide, i.e., oxygen absorbing and desorbing capability. With this oxygen absorbing and desorbing capability, the cerium oxide-containing materials purify noxious components in exhaust gases such as hydrocarbons, carbon monoxide, and nitrogen oxides at excellent efficiency. As such, large quantities of the cerium oxide-containing materials are used as a co-catalyst.

It is most critical for activating the function of such cerium oxide-containing co-catalyst material to keep the co-catalyst at a high temperature. Low temperature of the exhaust gas, for example at engine start-up, will result in low purifying efficiency. Vehicle manufacturers are presently trying to solve this problem by placing the catalyst system close to the engine for introducing hot exhaust gas right after its emission from the engine into the catalyst system. There is also a demand for co-catalyst materials that are activated at lower temperatures.

In general, efficiency of exhaust gas treatment with a catalyst is proportional to the contact area between the active phase of the catalyst and the exhaust gas, and to the oxygen absorbing and desorbing capability of the co-catalyst material, such as ceric oxide. Thus the co-catalyst material is required to have a sufficiently large specific surface area and a sufficiently high oxygen absorbing and desorbing capability, as well as high activity at lower temperatures.

For solving these problems, JP-7-61863-B proposes a method for obtaining a ceric oxide having good heat resistance, including precipitating ceric hydroxide in a reaction medium at pH 6 to about pH 10, treating the resulting precipitate in an autoclave at 100 to 350° C., and calcining at 300 to 1000° C., to thereby obtain ceric oxide. However, the heat resistance of the resulting ceric oxide represented by the specific surface area after calcination at 900° C. is 15 $m^2/g$, which is not sufficient.

JP-2001-89143-A, JP-2000-281343-A, JP-2789313-B, and JP-2000-128537-A propose cerium-containing oxides having improved oxygen storage capacity (OSC) However, all of these oxides are composite oxides containing ceric oxide having one or more other elements solid-solutioned therein, and are not high-purity ceric oxides.

JP-3-24478-B, JP-3-24411-B, and JP-2537662-B propose methods for preparing ceric oxide including refluxing an aqueous solution of ceric nitrate, separating the resulting hrydrolysate by filtering, washing, drying, and calcining, to thereby prepare ceric oxide. The ceric oxide thus obtained, however, has low heat resistance represented by a specific surface area after calcination at 900° C. for 5 hours of as low as not higher than 10 $m^2/g$.

DISCLOSURE OF THE INVENTION

It is therefore an object of the present invention to provide ceric oxide that has excellent heat resistance and oxygen absorbing and desorbing capability useful as a co-catalyst material suitable for a catalyst for purifying exhaust gas, that is capable of maintaining a large specific surface area even in use in a high temperature environment, and that is suitable for use in a high temperature environment, yet capable of exhibiting high oxygen absorbing and desorbing capability also in a lower temperature range, a method for preparing such ceric oxide, and a catalyst for purifying exhaust gas utilizing such ceric oxide.

The present inventors have made an intensive research for achieving the above objects. First, the inventors made a detailed research on the possible effect of crystallinity of cerium oxide hydrate, which is a precursor of ceric oxide, on the drop in the specific surface area observed in conventional ceric oxide upon heating to a high temperature, irrespective of its large specific surface area before heating. Through the research, it was confirmed that crystallinity of a cerium oxide precursor prepared by a conventional method known to produce a highly heat resistant ceric oxide, i.e. by drying a cerium sol, an aqueous solution of a cerium salt, or a mixture of these, is extremely sensitive to thermal energy, possibly due to its microcrystal. This thermal sensitivity causes the conventional ceric oxide to be highly sintered and to show remarkable crystal growth in a high temperature range, failing to keep a large specific surface area. Thus the inventors have made intensive efforts to increase the crystallinity of the precursor, and found out a reaction method for improving the crystallinity of the precursor at a high temperature under an oxidizing atmosphere, to thereby complete the invention.

According to the present invention, there is provided a ceric oxide which is an oxide consisting essentially of ceric oxide and has a specific surface area of not smaller than 30.0 $m^2/g$ after calcination at 900° C. for 5 hours.

According to the present invention, there is also provided a method for preparing the above ceric oxide comprising the steps of:

(a) providing a cerium solution not less than 90 mol % of which cerium ions are tetravalent,
(b) holding said cerium solution prepared in step (a) at 60 to 220° C. under heating,
(c) cooling said heated cerium solution,
(d) adding a precipitant to said cooled cerium solution to obtain a precipitate, and
(e) calcining said precipitate.

According to the present invention, there is also provided a catalyst for purifying exhaust gas comprising a co-catalyst, wherein said co-catalyst comprises the above ceric oxide.

PREFERRED EMBODIMENTS OF THE INVENTION

Figure 1:
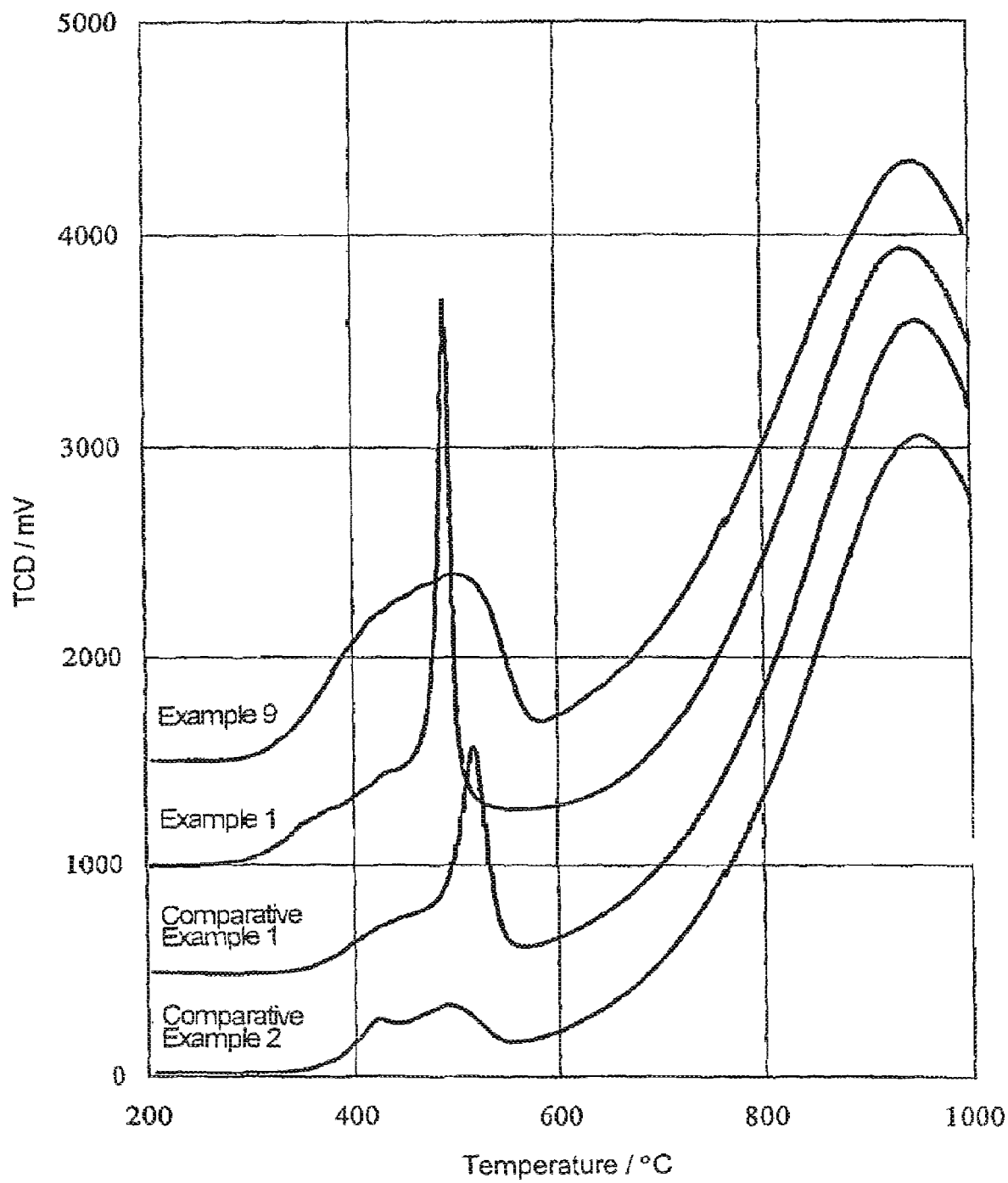
FIG. 1 is a graph showing TPR curves drawn in Examples 1 and 9 and Comparative Examples 1 and 2.

The present invention will now be explained in detail.

The ceric oxide according to the present invention is an oxide consisting essentially of ceric oxide, and has a specific surface area of not smaller than 30.0 m$^2$/g, preferably not smaller than 40.0 m$^2$/g, more preferably not smaller than 50.0 m$^2$/g, after calcination at 900° C. for 5 hours. The maximum specific surface area after calcination at 900° C. for 5 hours is not particularly limited, and may usually be about 100 m$^2$/g.

The ceric oxide of the present invention generally has a large specific surface area of not smaller than 180 m$^2$/g after calcination at 250° C. for 5 hours, not smaller than 160 m$^2$/g after calcination at 300° C. for 5 hours, not smaller than 40.0 m$^2$/g after calcination at 800° C. for 5 hours, not smaller than 30.0 m$^2$/g after calcination at 900° C. for 5 hours, and not smaller than 20.0 m$^2$/g after calcination at 1000° C. for 5 hours. No ceric oxide is hitherto known having such a large specific surface area after calcination at such high temperatures. In general, when oxide powders are heated above a particular temperature range dependent on their composition and production process, the degree of sintering and crystal growth of the powders increase remarkably to cause drop in the specific surface area. It is known that ceric oxide remarkably experiences this drop at about 800° C. or higher, so that catalyst systems for purifying exhaust gas are usually designed, taking such heat resistance of the materials into consideration.

Having a large specific surface area even after calcination at 900° C. for 5 hours as mentioned above, the ceric oxide of the present invention may be used as a co-catalyst material capable of withstanding expected use at a higher temperature of about 900° C.

The specific surface area referred to in the present specification is measured according to the BET method utilizing absorption of nitrogen gas, which is the most standard method for measuring the specific surface area of powders.

The ceric oxide of the present invention may preferably has an S1/S2 ratio, that is, a ratio of the area (S1) defined by the baseline and the TPR curve in the temperature range of 200 to 600° C., to the area (S2) defined by the baseline and the TPR curve in the temperature range of 600 to 1000° C., of usually not lower than 0.120, more preferably not lower than 0.150, most preferably not lower than 0.190, measured after calcination at 1000° C. for 5 hours. Having the S1/S2 ratio of not lower than 0.120 means that the ceric oxide exhibits excellent reducibility in a low temperature range of not higher than 600° C., after calcination at as high as 1000° C. A higher S1/S2 ratio of a ceric oxide is expected to result in a higher oxygen absorbing and desorbing capability and higher activity to purify exhaust gas at a lower temperature. As used herein, the "baseline" means a line segment drawn from the point on the TPR curve corresponding to 200° C. in parallel to the axis representing temperature, up to 1000° C.

The TPR is performed using a temperature programmed desorption analyzer (trade name: TP-5000) manufactured by OKURA RIKEN CO., LTD., with a carrier gas containing 90% argon and 10% hydrogen, at a gas flow rate of 30 ml/min, at a heating rate of a sample during measurement of 13.3° C./min, and using 0.5 g of a sample.

The ceric oxide of the present invention preferably has, after calcination at 900° C. for 5 hours, OSC of not smaller than 0.60 mlO$_2$/g/s evaluated at 400° C. The maximum OSC is not particularly limited, and is usually 2.0 mlO$_2$/g/s. No ceric oxide is hitherto known having such high OSC. For catalysts for purifying vehicle exhaust gas, the OSC and the active temperature of a co-catalyst material, such as ceric oxide, are important. Usually, catalysts for purifying vehicle exhaust gas do not function until they are heated to a particular temperature, and prematurely discharge exhaust gas without purifying the noxious components therein. Thus it is critical for the co-catalyst material to have excellent OSC shown at as low temperature as possible. In this regard, the ceric oxide of the present invention may preferably have the excellent OSC as mentioned above, and is thus quite useful for catalysts for purifying vehicle exhaust gas.

In the present Invention, the OSC is determined by holding 30 mg of a sample in the atmosphere at 900° C. for 5 hours, allowing to cool to an ordinary temperature, heating up to 400° C., subjecting to alternate flows of two different carrier gases (one contains 95% helium and 5% carbon monoxide, and the other contains 97.5% helium and 2.5% oxygen) at the flow rate of 200 ml/min at the interval of 1 second, measuring the amounts of carbon monoxide and oxygen in the carrier gases passed through the sample by means of a mass spectrograph, and making a calculation in accordance with the following formula:

$$OSC(mg/g/s) = (\Delta CO \times rCO)/2 \times WT$$

wherein ΔCO stands for an amount of CO reduced in a unit time, rCO stands for a flow rate of CO gas, and WT stands for weight of the sample.

The ceric oxide of the present invention preferably has a tap density of usually not higher than 1.3 g/ml, more preferably not higher than 1.2 g/ml, after calcination at 300° C. for 10 hours. The minimum tap density is not particularly limited, and is usually about 0.80 g/ml. The tap density may be measured by taking 10 g of ceric oxide calcined at 300° C. for 10 hours in a 20 ml cylinder, and tapping the cylinder with drop height of 2 cm for 200 strokes.

The ceric oxide of the present invention preferably has a total pore volume of usually not smaller than 0.50 ml/g, more preferably not smaller than 0.60 ml/g, after calcination at 300° C. for 10 hours. The maximum total pore volume is not particularly limited, and is usually 1.5 ml/g. The total pore volume may be measured by ordinary mercury porosimeter.

The ceric oxide of the present invention may preferably be prepared by the production method according to the present invention to be discussed below, with good reproducibility and in an economical manner.

According to the present method, first a cerium solution not less than 90 mol % of which cerium ions are tetravalent is provided in step (a).

In step (a), the cerium solution not less than 90 mol % of which cerium ions are tetravalent, may preferably be a ceric nitrate solution. A ceric nitrate solution initially contains 250 g per liter of cerium in terms of cerium oxide, and has an initial acid concentration of usually 0.1 to 1 N. The initial acid concentration relates to the acid concentration In the subsequent reaction. If the acid concentration is too low, the crystallinity of the precipitate to be discussed later may not be improved sufficiently, resulting in low heat resistance of the objective ceric oxide. If the acid concentration is too high, excess base is required in the neutralization reaction for precipitating cerium, thus being industrially disadvantageous.

Thus the acid concentration of the cerium solution is adjusted to usually 5 to 150 g/L, preferably 10 to 120 g/L, more preferably 15 to 100 g/L, in terms of cerium oxide, usually with water, preferably with deionized water.

According to the present method, next the cerium solution prepared in step (a) is held at 60 to 220° C. under heating to cause reaction of the cerium solution in step (b). Any reaction vessel may be used in step (b) without critical limitation, and either a sealed vessel or an open vessel may be used. Specifically, an autoclave reactor may preferably be used.

In step (b), the temperature for holding under heating is 60 to 22.0° C., preferably 80 to 180° C., more preferably 90 to 160° C., and the duration of holding under heating is usually 10 minutes to 48 hours, preferably 30 minutes to 36 hours, more preferably 1 hour to 24 hours. If the cerium solution is not sufficiently held under heating, the crystallinity of the precipitate to be discussed later may not be improved, resulting in insufficient heat resistance of the objective ceric oxide. Even if the cerium solution is held under heating for a longer time, the heat resistance may be affected little, and thus being industrially disadvantageous.

In the method of the present invention, following step (b), the heated cerium solution is usually cooled in step (c).

In step (c), the cerium solution may usually be cooled under stirring. Means for cooling are not critical, and may be cooling in an atmosphere or forced cooling with cooling tube. The cooling temperature is usually not higher than 60° C., preferably not higher than room temperature. Through this cooling step (c), a precursor solution is prepared.

In the method of the present invention, a precipitant is added to the cooled cerium solution to prepare a precipitate in step (d).

The precipitant used in step (d) may be a base such as sodium hydroxide, potassium hydroxide, an aqueous ammonia solution, ammonia gas, or mixtures thereof, with an aqueous ammonia solution being preferred.

The precipitant may be added by preparing an aqueous solution of the precipitant at a suitable concentration and adding the solution to the precursor solution prepared in step (c) under stirring, or when ammonia gas is used, by blowing the gas into the reaction vessel under stirring. The amount of the precipitant may easily be decided by tracing the pH change of the solution. Usually, a sufficient amount is such that the pH of the solution is not lower than 7, and a preferred amount is such that the pH is 7 to 8.

Through the precipitation reaction in step (d), a product with grown crystals may be precipitated. This product is a preferable precursor for obtaining the ceric oxide of the present invention, and may be separated, for example, by Nutsche method, centrifuging, or filter pressing. The precipitate may optionally be washed with water, as required. Further, the precipitate may optionally be dried to a suitable extent for improving the efficiency in the following step (e).

In order to further improve the heat resistance of the objective ceric oxide, the precipitate obtained in step (d) may be subjected to, before step (e), step (d-1) of dispersing the precipitate in a solvent such as water, and heat-treating the resulting solution at usually 60 to 220° C., preferably 80 to 180° C., more preferably 90 to 160° C., to obtain a reprecipitate. The duration of the heat treatment is usually 10 minutes to 48 hours, preferably 30 minutes to 36 hours, more preferably 1 to 24 hours According to the present method, the precipitate thus obtained is calcined in step (e) to obtain the objective ceric oxide.

In step (e), the calcination temperature may suitably be selected from the range of usually 250 to 900° C. The selection of the temperature may be made as desired, depending on the required or guaranteed values of the specific surface area and bulk density. From a practical point of view to prepare a co-catalyst material wherein the specific surface area is important, the calcination temperature may preferably be 250 to 800° C., more preferably 250 to 700° C., most preferably 280 to 450° C. The duration of calcination may suitably be determined depending on the temperature, and may preferably be 1 to 10 hours.

After step (e), the ceric oxide obtained may usually be pulverized. The pulverization may sufficiently be performed in an ordinary pulverizer, such as a hammer mill, to obtain a powder of a desired particle size.

The ceric oxide obtained by the present method may be given a desired particle size through the above mentioned pulverization. For use as a co-catalyst in a catalyst for purifying exhaust gas, for example, a preferred average particle size of the ceric oxide is 1 to 50 μm.

The catalyst for purifying exhaust gas according to the present invention may be of any type, as long as it has a co-catalyst containing the ceric oxide of the present invention. The catalyst may be produced, for example, by a commonly known method and with commonly known other materials.

The ceric oxide of the present invention has a large specific surface area, and in particular, is capable of maintaining a specific surface area of at least 30.0 $m^2/g$ even after calcination at 900° C. for 5 hours. Thus the present ceric oxide finds particular application in a co-catalyst in catalysts for purifying exhaust gas, in place of conventional ceric oxide, and is useful in the field of more effective catalysts for purifying exhaust gas.

Further, the method of the present invention allows production of the above ceric oxide with good reproducibility and in an economical manner.

EXAMPLES

The present invention will now be explained in more detail with reference to Examples and Comparative Examples, without being limited to these.

Example 1

A ceric nitrate solution not less than 90 mol % cerium ions of which were tetravalent was taken so that 20 g of cerium in terms of cerium oxide was contained, and the total volume was adjusted to 1 liter with pure water. Here, the concentration in terms of cerium oxide was 20 g/L. The solution was placed in an autoclave reactor, heated to 100° C., held at this temperature for 24 hours, and allowed to cool in an atmosphere to room temperature.

Then an aqueous ammonia solution was added to neutralize to pH 8 to obtain cerium oxide hydrate in the form of a slurry. The slurry was then subjected to solid-liquid separation with a Nutsche filter, followed by separation of the mother liquor, to obtain a filter cake. The filter cake was calcined at 300° C. for 10 hours in a box-type electric furnace under air atmosphere to obtain cleric oxide, which was then ground in a mortar into ceric oxide powder (referred to as powder (A) hereinbelow). The specific surface area of powder A) was measured by the BET method. Further, the specific surface areas of powder (A) after calcination at 800° C. for 2 hours, at 900° C. for 5 hours, and at 1000° C. for 5 hours, respectively, were measured by the BET method. The tap density and total pore volume of powder (A) were also measured. Further, powder (A) was calcined at 900° C. for 5 hours, and then the OSC of the resulting ceric oxide powder was measured at 400° C. The results of these measurements are shown in Table 1.

Powder (A) was calcined at 1000° C. for 5 hours, and then the TPR measurement was made. The results are shown in FIG. 1. Further, from the TPR curve taken after calcination at 1003° C. for 5 hours, the ratio of the area (S1) defined by the baseline and the TPR curve in the temperature range of 200 to 600° C. to the area (S2) defined by the baseline and the TPR curve in the temperature range of 600 to 1000° C., i.e., the S1/S2 ratio, was determined. The results are shown in Table 1.

Example 2

Ceric oxide powder was prepared in the same way as in Example 1, except that the temperature and duration for holding the prepared ceric nitrate solution under heating were changed as shown in Table 1.

Example 3

A filter cake was obtained in the same way as in Example 1. The filter cake obtained was treated in an autoclave reactor, dispersed in water to reslurry, heated to 100° C., held at this temperature for 1 hour, and cooled to room temperature. The slurry was then subjected to solid-liquid separation with a Nutsche filter, to obtain a filter cake. The filter cake was calcined at 300° C. for 10 hours in a box-type electric furnace under air atmosphere, and ground in a mortar, to thereby obtain ceric oxide powder. The resulting powder was subjected to the same measurements as in Example 1. The results are shown in Table 1.

Examples 4 to 11

Ceric oxide powder was prepared in the same way as in Example 3, except that the concentration of the ceric nitrate solution, the temperature and duration for holding the ceric nitrate solution under heating were changed as shown in Table 1. The ceric oxide powder obtained was subjected to the same measurements as in Example 1. The results are shown in Table 1. In Example 9, the ceric oxide powder obtained by calcination at 300° C. for 10 hours, followed by pulverization in a mortar, was further calcined at 500° C. for 5 hours, or at 700° C. for 5 hours, and then the tap density and total pore volume were measured, respectively. The results of these are also shown in Table 1. Further in Example 9, the ceric oxide powder obtained by calcination at 300° C. for 10 hours, followed by pulverization in a mortar, was further calcined at 1000° C. for 5 hours, and then the TPR measurement was made as in Example 1. The results are shown in FIG. 1.

Comparative Example 1

Following experiment was made in accordance with the teaching of Example 9 of Jp-7-61863-B.

922 ml of a solution of cerous nitrate containing 150 g/L of $CeO_2$ and 38 ml of a solution of hydrogen peroxide diluted to 200 ml were placed at room temperature in an autoclave reactor having a useful volume of 2 liters 150 ml of an aqueous 3N ammonia solution were added, while maintaining the temperature at 80° C., until a pH equal to 9.5 was obtained. The reaction medium was maintained at 8° C. for 1 hour to obtain a precipitate. The resulting precipitate was separated with a Nutsche filter, and washed with water.

The entire mass of the thus obtained precipitate was suspended in 150 ml of an aqueous 1N ammonia solution, placed in an autoclave, and treated therein at 160° C. for 4 hours. At the end of this heat treatment, the precipitate was recovered with a Nutsche filter. The obtained ceric oxide powder was subjected to the measurements as in Example 1. The results are shown in Table 2. Further, similarly to Example 9, the ceric oxide powder was further calcined at 500° C. for 5 hours, or at 700° C. for 5 hours, and then the tap density and total pore volume were measured, respectively. The results of these are shown in Table 2. Still further, as in Example 1, the ceric oxide powder obtained by calcining at 300° C. for 10 hours, followed by pulverization in a mortar, was further calcined at 1000° C. for 5 hours, and then the TPR measurement was made. The results are shown in FIG. 1.

Comparative Example 2

A ceric nitrate solution not less than 90 mol % cerium ions of which were tetravalent was taken so that 20 g of cerium in terms of cerium oxide was contained, and the total volume was adjusted to 1 liter with pure water. Here, the concentration in terms of cerium oxide was 20 g/L. The resulting solution was immediately neutralized with an aqueous ammonia solution to pH 8 without the heat treatment in an autoclave reactor, to thereby obtain cerium oxide hydrate in the form of a slurry. The slurry was then subjected to solid-liquid separation with a Nutsche filter, followed by separation of the mother liquor, to obtain a filter cake. The filter cake was calcined at 300° C. for 10 hours in a box-type electric furnace under air atmosphere, and ground in a mortar into ceric oxide powder. The obtained powder was subjected to the same measurements as in Example 1. The results are shown in Table 2. Further, as in Example 1, the ceric oxide powder obtained by calcining at 300° C. for 10 hours, followed by pulverization in a mortar, was further calcined at 1000° C. for 5 hours, and then the TDR measurement was made. The results are shown in FIG. 1.

Comparative Example 3

A filter cake was obtained in the same way as in Comparative Example 2. The obtained filter cake was subjected to the heat treatment and calcination in the same way as in Example 3, to obtain ceric oxide powder. The powder was subjected to the same measurements as in Example 1. The results are shown in Table 2.

In Tables 1 and 2, REO concentration is the concentration of cerium in the ceric nitrate solution in terms of cerium oxide. BET(1) is the specific surface area of the ceric oxide powder obtained by calcining at 300° C. for 10 hours, followed by pulverization in a mortar; BET(2) is the specific surface area of the powder in BET(1) further calcined at 800° C. for 2 hours; BET(3) is the specific surface area of the powder in BET(1) further calcined at 900° C. for 5 hours; and BET(4) is the specific surface area of the powder in BET(1) further calcined at 100° C. for 5 hours, all measured by the BET method. The specific surface area is shown in $m^2/g$. Tap density (1) is the tap density of the ceric oxide powder obtained by calcining at 300° C. for 10 hours, followed by pulverization in a mortar; Tap density (2) is the tap density of the powder in Tap density (1) further calcined at 500° C. for 5 hours; and Tap density (3) is the tap density of the powder in Tap density (1) further calcined at 700° C. for 5 hours. The tap density is shown in g/ml. Total pore volume (1) is the total pore volume of the ceric oxide powder obtained by calcining at 300° C. for 10 hours, followed by pulverization in a mortar; Total pore volume (2) is the total pore volume of the powder in Total pore volume (1) further calcined at 500° C. for 5 hours; and Total pore volume (3) is the total pore volume of the powder in Total pore volume (1) further calcined at 700° C. for 5 hours. The total pore volume is shown in ml/g.

TABLE 1

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| REO Concentration (g/L) | 20 | 20 | 20 | 15 | 25 | 40 | 60 | 20 | 20 | 10 | 30 |
| Temperature (° C.) | 100 | 130 | 100 | 100 | 100 | 100 | 100 | 100 | 120 | 120 | 120 |
| Duration (h) | 24 | 1 | 24 | 24 | 24 | 24 | 24 | 6 | 6 | 6 | 6 |
| BET(1) | 175.4 | 155.1 | 197.4 | 236.6 | 213.4 | 166.0 | 172.0 | 241.4 | 217.1 | 215.3 | 220.0 |
| BET(2) | 73.3 | 75.5 | 85.6 | 80.0 | 80.1 | 68.3 | 72.5 | 78.6 | 88.6 | 81.6 | 84.4 |
| BET(3) | 33.6 | 36.6 | 47.7 | 44.6 | 42.3 | 31.1 | 30.8 | 40.7 | 48.0 | 53.2 | 50.3 |
| BET(4) | 21.6 | 22.4 | 23.7 | 22.2 | 21.6 | 21.1 | 22.3 | 21.0 | 24.2 | 23.7 | 23.0 |
| Tap density (1) | 1.1 | 1.1 | 1.1 | 1.1 | 1.1 | 1.2 | 1.2 | 1.1 | 1.1 | 1.1 | 1.1 |
| Tap density (2) | — | — | — | — | — | — | — | — | 1.1 | — | — |
| Tap density (3) | — | — | — | — | — | — | — | — | 1.1 | — | — |
| Total Pore volume (1) | 0.65 | 0.63 | 0.71 | 0.68 | 0.65 | 0.66 | 0.66 | 0.63 | 0.74 | 0.72 | 0.75 |
| Total Pore volume (2) | — | — | — | — | — | — | — | — | 0.76 | — | — |
| Total Pore volume (3) | — | — | — | — | — | — | — | — | 0.83 | — | — |
| OSC (ml$^2$/g/s) | 0.63 | 0.65 | 1.05 | 1.01 | 0.98 | 0.61 | 0.61 | 0.94 | 1.08 | 1.27 | 1.20 |
| S1/S2 ratio | 0.189 | 0.191 | 0.211 | 0.208 | 0.202 | 0.188 | 0.185 | 0.195 | 0.214 | 0.225 | 0.217 |

TABLE 2

| | Comparative Example | | |
|---|---|---|---|
| | 1 | 2 | 3 |
| BET(1) | 140.8 | 100.5 | 105.6 |
| BET(2) | 21.0 | 15.6 | 16.0 |
| BET(3) | 16.0 | 9.40 | 9.20 |
| BET(4) | 7.40 | 3.20 | 3.40 |
| Tap density (1) | 1.8 | 1.9 | 1.8 |
| Tap density (2) | 1.7 | — | — |
| Tap density (3) | 1.8 | — | — |
| Total pore volume (1) | 0.35 | 0.33 | 0.34 |
| Total pore volume (2) | 0.38 | — | — |
| Total pore volume (3) | 0.49 | — | — |
| OSC (ml$^2$/g/s) | 0.40 | 0.29 | 0.30 |
| S1/S2 ratio | 0.108 | 0.077 | 0.071 |

What is claimed is:

1. A ceric oxide which is an oxide consisting essentially of ceric oxide, and has following properties:
said ceric oxide has a specific surface area of not smaller than 30.0 m$^2$/g after calcination at 900° C. for 5 hours, and
said ceric oxide has an S1/S2 ratio of not lower than 0.120 taken after calcination at 1000° C. for 5 hours, said S1/S2 ratio is a ratio of an area (S1) defined by a baseline and a TPR curve in a temperature range of 200 to 600° C. to an area (S2) defined by said baseline and said TPR curve in a temperature range of 600 to 1000° C.

2. The ceric oxide of claim 1, wherein said ceric oxide has OSC of not smaller than 0.60 mlO$_2$/g/s at 400° C., after calcination at 900° C. for 5 hours.

3. The ceric oxide of claim 1, wherein said ceric oxide has a tap density of not higher than 1.3 g/ml, after calcination at 300° C. for 10 hours.

4. The ceric oxide of claim 1, wherein said ceric oxide has a total pore volume of not smaller than 0.50 ml/g, after calcination at 300° C. for 10 hours.

5. A method for preparing a ceric oxide of claim 1, comprising the steps of:
(a) providing a cerium solution wherein not less than 90 mol % of the cerium are tetravalent cerium ions, said cerium solution having a cerium concentration of 10 to 60 g/L in terms of cerium oxide;
(b) holding said cerium solution prepared in step (a) at 60 to 220° C. under heating;
(c) cooling said heated cerium solution;
(d) adding a precipitant to said cooled cerium solution to obtain a precipitate; and
(e) calcining said precipitate.

6. The method of claim 5, wherein said calcining in step (e) is carried out at 250 to 900° C.

7. The method of claim 5, further comprising, after step (d) and before step (e), step (d1) of heat-treating said precipitate obtained in step (d) in a solvent at 60 to 220° C. to obtain a precipitate.

8. The method of claim 5, wherein said step (a) comprises:
(a-1) providing an initial cerium solution wherein not less than 90 mol % of the cerium are tetravalent cerium ions, and
(a-2) adjusting a cerium concentration of said initial cerium solution to prepare a cerium solution having a cerium concentration of 10 to 60 g/L in terms of cerium oxide.

9. A catalyst for purifying exhaust gas comprising a co-catalyst, wherein said co-catalyst comprises ceric oxide of claim 1.

* * * * *